(12) United States Patent
Um et al.

(10) Patent No.: US 9,323,111 B2
(45) Date of Patent: Apr. 26, 2016

(54) ARRAY SUBSTRATE COMPRISING FIRST AND SECOND COMMON ELECTRODES THAT ARE POWERED INDEPENDENTLY, ITS MANUFACTURING METHOD, AND DISPLAY DEVICE

(71) Applicant: BOE TECHNOLOGY GROUP CO., LTD., Beijing (CN)

(72) Inventors: Yoon-Sung Um, Beijing (CN); Hyun-Sic Choi, Beijing (CN); Zhiqiang Xu, Beijing (CN); Hui Li, Beijing (CN)

(73) Assignee: BOE TECHNOLOGY GROUP CO., LTD. (CN)

( * ) Notice: Subject to any disclaimer, the term of this patent is extended or adjusted under 35 U.S.C. 154(b) by 100 days.

(21) Appl. No.: 14/105,379

(22) Filed: Dec. 13, 2013

(65) Prior Publication Data
US 2014/0168555 A1 Jun. 19, 2014

(30) Foreign Application Priority Data
Dec. 14, 2012 (CN) .......................... 2012 1 0546425

(51) Int. Cl.
*G02F 1/1343* (2006.01)
*G02F 1/136* (2006.01)
*G02F 1/1362* (2006.01)

(52) U.S. Cl.
CPC .............. *G02F 1/1343* (2013.01); *G02F 1/136* (2013.01); *G02F 1/136286* (2013.01); *G02F 2001/13606* (2013.01); *G02F 2001/134318* (2013.01); *Y10T 29/49117* (2015.01)

(58) Field of Classification Search
CPC ................... G02F 1/1343; G02F 2001/13606; G02F 2001/134318

USPC .......................................................... 349/141
See application file for complete search history.

(56) References Cited

U.S. PATENT DOCUMENTS

2002/0159016 A1 10/2002 Nishida et al.
2006/0192906 A1 8/2006 Ryu et al.
(Continued)

FOREIGN PATENT DOCUMENTS

CN 1410958 4/2003
CN 101075054 11/2007
(Continued)

OTHER PUBLICATIONS

Third Office Action issued in corresponding Chinese Application No. 201210546425.3 dated Jun. 30, 2015.
First Office Action issued in corresponding Chinese Application No. 2012105464253 dated Nov. 20, 2014.
Second Office Action issued in corresponding Chinese Application No. 2012105464253 dated Mar. 31, 2015.
(Continued)

*Primary Examiner* — Paul Lee
(74) *Attorney, Agent, or Firm* — Baker Hostetler LLP (57) ABSTRACT

The present invention provides an array substrate, its manufacturing method, and a display device. The array substrate comprises a plurality of grid lines a plurality of data lines, and pixel regions defined by every two adjacent grid Fines and every two adjacent data lines. The pixel region is provided with a common electrode, a pixel electrode and a thin film transistor. The common electrode includes a first common electrode and a second common electrode which are powered independently. A projection of the first common electrode onto a layer where the data lines are located covers the data line, and a projection of the second common electrode onto a layer where the pixel electrode is located falls on the pixel electrode.

12 Claims, 8 Drawing Sheets

(56) References Cited

U.S. PATENT DOCUMENTS

2007/0152943 A1* 7/2007 Hwang et al. .................. 345/98
2009/0033848 A1* 2/2009 Oka et al. ...................... 349/114
2009/0225250 A1 9/2009 Lyu et al.
2010/0128189 A1* 5/2010 Teranishi .............. G02F 1/1323
          349/33
2011/0149184 A1* 6/2011 Tsai .................. G02F 1/136213
          349/38

FOREIGN PATENT DOCUMENTS

CN    101217131    7/2008
JP    2007164198   6/2007
WO    2012118513   9/2012

OTHER PUBLICATIONS

European Search Report issued in corresponding European Application No. 13196719.2 dated Apr. 16, 2014.

* cited by examiner

Fig. 9

ARRAY SUBSTRATE COMPRISING FIRST AND SECOND COMMON ELECTRODES THAT ARE POWERED INDEPENDENTLY, ITS MANUFACTURING METHOD, AND DISPLAY DEVICE

CROSS REFERENCE TO RELATED APPLICATION

This application claims the benefit of CN patent application No. 201210546425.3 filed on Dec. 14, 2012, all of which is incorporated herein by reference.

TECHNICAL FIELD

The present invention relates to the field of liquid crystal display technology, in particular to an array substrate, its manufacturing method and a display device.

BACKGROUND

Figure 1:
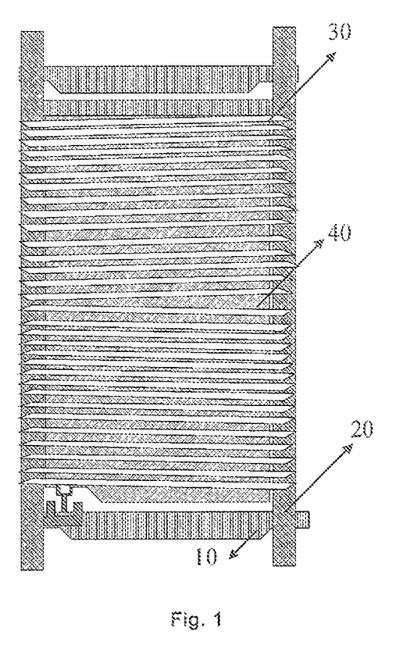
FIG. 1 is a plan view of an array substrate in the prior art.

FIG. 1 is a plan view showing an array substrate in prior art. The array substrate comprises grid lines 10 on a substrate and data lines 20 arranged perpendicular to the grid lines. The grid lines 10 and the data lines 20 define pixel regions in which a pixel electrode 40, a common electrode 30 and a thin-film transistor (TFT) 50 are arranged in parallel to each other. For a pixel region of the array substrate with such a structure, its long side is the data line 20 and its short side is the grid line 10. There is an overlapping capacitor C2 between the data line 40 and the common electrode 30 arranged above the data line 40.

Figure 2:
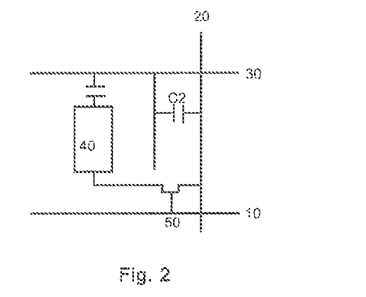
FIG. 2 is a schematic diagram showing the circuit connection of a common electrode and a data line, a grid line and a pixel electrode in the array substrate as shown in FIG. 1.

FIG. 2 is a schematic diagram showing the circuit connection of the common electrode 30 and the data line 20, the grid line 10 and the pixel electrode 40 in an array substrate with the above-mentioned structure.

Large-size TV products and 3D products are current development trends in the field of TV production. However, in order to develop these products successfully, a driving frequency of the products must be increased from 60 Hz to 12 GHz, even 240 Hz.

In the array substrate as shown in FIG. 1, due to the overlapping capacitor between the data line 20 and the common electrode 30, it takes a short period of time to charge the pixels. When the array substrate is driven at a high frequency, a voltage of the common electrode is influenced so that a greenish phenomenon occurs on a screen of the product. Such a problem is very difficult to be overcome even if a switching virtual circuit (SVC) is used.

SUMMARY

An object of the present invention is to provide an array substrate, its manufacturing method and a display device, so as to avoid an overlapping capacitor existing between a data line and a common electrode, thereby to remarkably reduce a greenish phenomenon even if the array substrate is driven at a high frequency.

In one aspect, the present invention provides an array substrate, comprising a plurality of grid lines, a plurality of data lines, and pixel regions defined by every two adjacent grid lines and every two adjacent data lines. The pixel region is provided with a common electrode, a pixel electrode and a thin film transistor. The common electrode includes a first common electrode and a second common electrode which are powered independently. A projection of the first common electrode onto a layer where the data lines are located covers the data line, and a projection of the second common electrode onto a layer where the pixel electrode is located fails on the pixel electrode.

The first common electrode is connected to and powered through a common electrode power supply circuit of a peripheral circuit. The second common electrode is powered through a common electrode line.

The second common electrode is located above the pixel electrode and does not overlap the data line. The second common electrode has a slot structure, and the pixel electrode has a plate shape.

The second common electrode is located below the pixel electrode and does not overlap the data line. The second common electrode has a plate shape, and the pixel electrode has a slot structure.

When the common electrode line and the second common electrode are located on different layers, the second common electrode is connected to the common electrode line through a via hole.

When the common electrode line and the second common electrode are located on the same layer, the second common electrode is directly connected to the common electrode line.

The grid line vertically overlaps the data line, and the pixel region is of a rectangular shape. The grid line constitutes a short side of the pixel region and the data line constitutes a long side of the pixel region.

The thin film transistor is provided at a position where the grid line vertically overlaps the data line, and the data line is connected to the pixel electrode through the thin film transistor.

In another aspect, the present invention further provides a method of manufacturing an array substrate, comprising a step forming a pattern including a data line and a pixel electrode. The method further comprises:

a step of forming a pattern including a first common electrode and a second common electrode, the first common electrode and the second common electrode being powered independently, a projection of the first common electrode onto a layer where the data line is located covering the data line, and a projection of the second electrode onto a layer where the pixel electrode is located falling on the pixel electrode.

When forming the pattern of the first common electrode, the first common electrode is connected to a common electrode power supply circuit of a peripheral circuit.

The method further comprises:

a step of forming a pattern of a common electrode line.

When forming the pattern of the second common electrode, the second common electrode is connected to the common electrode line.

In yet another aspect, the present invention further provides a display device comprising the above-mentioned array substrate.

The present invention has the following advantageous effects.

According to the present invention, the first common electrode and the second common electrode which are powered independently are formed, the projection of the first common electrode onto die layer where the data line is located covers the data line, and the projection of the second common electrode onto the layer where the pixel electrode is located fails on the pixel electrode. Because the data line is shielded by the first common electrode, it may avoid an overlapping capacitor existing between the data line and the second common electrode, thereby to remarkably reduce the greenish phenomenon when the array substrate is driven at a high frequency.

DETAILED DESCRIPTION

To make technical problems to be solved, technical solutions and advantages of the present invention more apparent, the present invention is described hereinafter in conjunction with the drawings and the embodiments.

Figure 3:
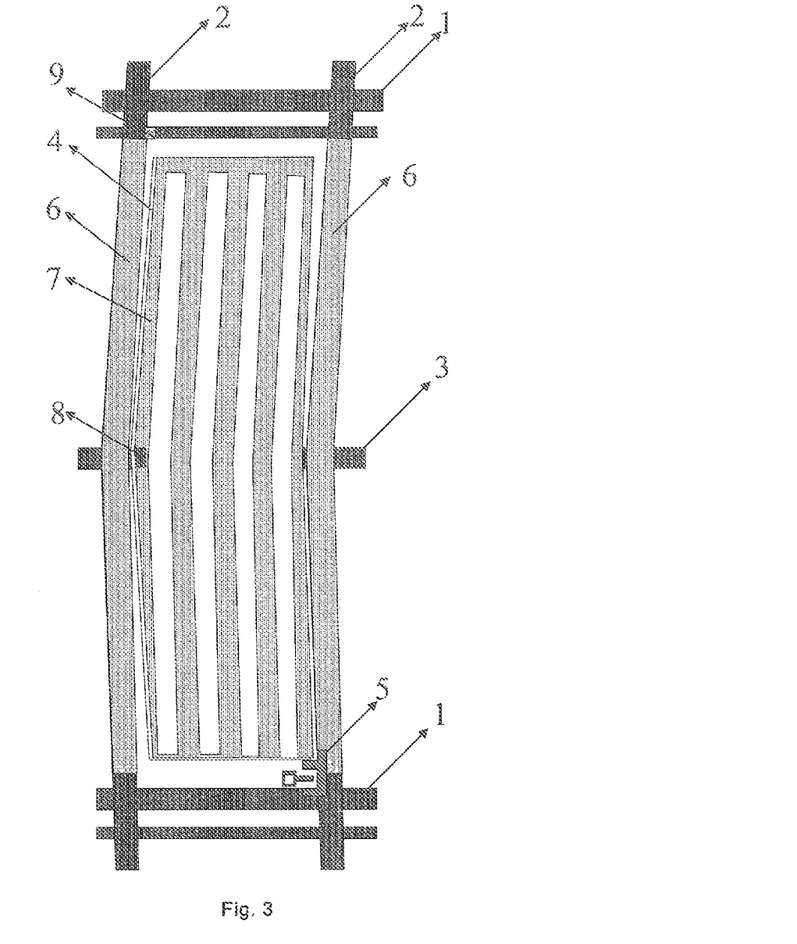
FIG. 3 is a plan view of an array substrate according to an embodiment of the present invention.

As shown in FIG. 3, an embodiment of the present invention provides an array substrate, comprising a substrate (not shown), a plurality of grid lines 1, a plurality of data lines 2, and pixel regions defined by every two adjacent grid lines 1 and every two adjacent data lines 2. The pixel region is provided with a common electrode, a pixel electrode 4 and a thin film transistor 5. The common electrode includes a first common electrode 6 and a second common electrode 7 powered independently. A projection of the first common electrode 6 onto a layer where the data line 2 is located covers the data line 2 and serves as a shielding line for the data line, and a projection of the second common electrode 7 onto a layer where the pixel electrode 4 is located falls on the pixel electrode 4.

According to the present invention, the first common electrode 6 and the second common electrode 7 which are powered independently are formed, the projection of the first common electrode 6 onto the layer where the data line 2 is located covers the data line 2 and serves as the shielding line for the data line 2, so that the data line 2 does not overlap the second common electrode 7. As a result, the influence of a voltage signal of the data line 2 on a voltage signal of the second common electrode 7 may be avoided, thereby to avoid an overlapping capacitor existing between the data line 2 and the second common electrode 7. In addition, the projection of the second common electrode 7 onto the layer where the pixel electrode is located fails on the pixel electrode 4, so it may ensure the generation of a normal capacitance and the generation of an electric field. Moreover, because the influence of the voltage signal of the data line 2 on the voltage signal of the second common electrode 7 is shielded by the first common electrode 6, a greenish phenomenon is remarkably reduced when the array substrate is driven at a high frequency.

In the above embodiment, the first common electrode 6 is connected to and powered through a common electrode power supply circuit 9 of a peripheral circuit. Of course, it may also be powered in any other ways.

In the above embodiment, the array substrate according to an embodiment of the present invention may further comprise a common electrode line 3 connected to the second common electrode 7, and the second common electrode 7 is powered through the common electrode line 3. When the common electrode line 3 and the second common electrode 7 are located on different layers, the second common electrode 7 is connected to the common electrode line through a via hole 8. As shown in FIG. 3, the common electrode line 3 and the grid line 1 are located on the same layer, without intersecting with each other. When the second common electrode 7 is formed, it is connected to the common electrode line 3 through the via hole 8 in a respective layer above the grid lines. When the common electrode line 3 and the second common electrode 7 are located on different layers, it is not limited to the mode as shown in FIG. 3. For example, the common electrode line 3 may be located on the same layer as a source/drain electrode, and it may be formed when manufacturing the source/drain electrode.

Of course, the common electrode line 3 may also be located on the same layer as the second common electrode 7, and at this time, the second common electrode 7 is directly connected to the common electrode line 3.

When the second common electrode 7 is located above the pixel electrode and has a slot structure, it may be powered by itself rather than by the common electrode line 3.

In the above embodiment of the present invention, the second common electrode 7 may be located above the pixel electrode 4 and does not overlap the data line 2. The common electrode 7 has a slot structure and the pixel electrode 4 has a plate shape.

To be specific, when the common electrode 7 is located above the pixel electrode 4, it is located below a passivation layer in the array substrate or on an uppermost layer of the array substrate, the pixel electrode 4 is located below the second common electrode 7, and there is an insulating layer between the pixel electrode 4 and the second common electrode 7. If the second common electrode 7 is located below the passivation layer or on the uppermost layer of the array substrate, it may be directly extended to the peripheral circuit and powered thereby. Of course, the second common electrode 7 may also be powered by the common electrode line.

In the above embodiment of the present invention, the second common electrode 7 may also be located below the pixel electrode 4 and does not overlap the data line 2. The second common electrode 7 has a plate shape, and the pixel electrode 4 has a slot structure.

To be specific, the second common electrode 7 is located on a first layer of the substrate of the array substrate, and the pixel electrode 4 is located above the second common electrode 7 and connected to a drain electrode of a TFT in the array substrate through a via hole.

Of course, the position relationship between the common electrode 7 and the pixel electrode 4 in the above embodiment is not limited to the structure of the array substrate mentioned above, and the array substrate with the other structures may also be applicable. It should be appreciated for a person skilled in the art that, the pixel electrode may have a plate shape or a slot structure, and so does the common electrode. The position relationship between the pixel electrode and the common electrode may be reversed, as long as the electrode above has a slot structure while the electrode below has a plate shape.

In the above embodiment of the present invention, the grid line 1 vertically overlaps the data line 2, and the pixel region is of a rectangular shape. The grid line 1 constitutes a short side of the pixel region and the data line 2 constitutes a long side of the pixel region. The thin film transistor 5 is provided at a position where the grid line 1 vertically overlaps the data line 2, and the data line 2 is connected to the pixel electrode 4 through the thin film transistor 5.

According to the above, embodiment of the present invention, the second common electrode 7 corresponding to the pixel region is separated from the first common electrode 6 for protecting the data line in a manner of being powered independently, so as to improve the greenish phenomenon caused by a coupling capacitance between the data line 2 and the second common electrode 7. In addition, the above-mentioned structure can remarkably reduce the generated storage capacitance while ensuring the formation of an edge electric field, so as to drive a product at a high frequency and to meet the charge rate requirement.

In addition, the solutions according to the above embodiments of the present invention are applicable to a large-size liquid crystal display device with a high charge rate.

The present invention further provides a method of manufacturing an array substrate, comprising a step of forming a pattern including a data line and a pixel electrode. The method further comprises:

a step of forming a pattern including a first common electrode and a second common electrode, the first common electrode and the second common electrode being powered independently, a projection of the first common electrode onto a layer where the data line is located covering the data line, and a projection of the second electrode onto a layer where the pixel electrode is located falling on the pixel electrode.

Referring to FIGS. 4-8, embodiments of the present invention provides a method of manufacturing the array substrate as shown in FIG. 3, comprising: providing a substrate 11; forming a pattern including a data line 2 on the substrate 11; forming a pattern including the pixel electrode 4; forming a pattern including the first common electrode 6 and the second common electrode 7, the first common electrode and the second common electrode being powered independently, a projection of the first common electrode 6 onto a layer where the data line is located covering the data line 2, and a projection of the second electrode 7 onto a layer where the pixel electrode 4 is located falling on the pixel electrode 4.

In the above embodiment, when forming the first common electrode 6, the first common electrode 6 is connected to a common electrode power supply circuit 9 of a peripheral circuit.

When forming the second common electrode 7, the second common electrode 7 is connected to the common electrode line 3. When the common electrode line 3 is located on a different layer from the second common electrode 7, the second common electrode 7 is connected to the common electrode line 3 through a via hole. When the common electrode line 3 is located on the same layer with the second common electrode 7, the second common electrode 7 may be directly connected to the common electrode line 3.

Figure 4:
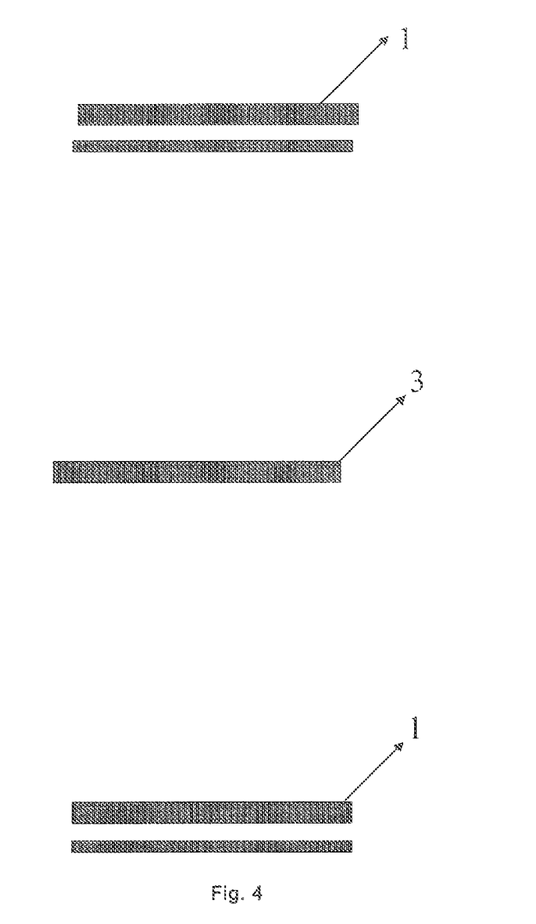
FIGS. 4-7 are schematic diagrams showing the process of manufacturing the array substrate according to an embodiment of the present invention.
Figure 5:
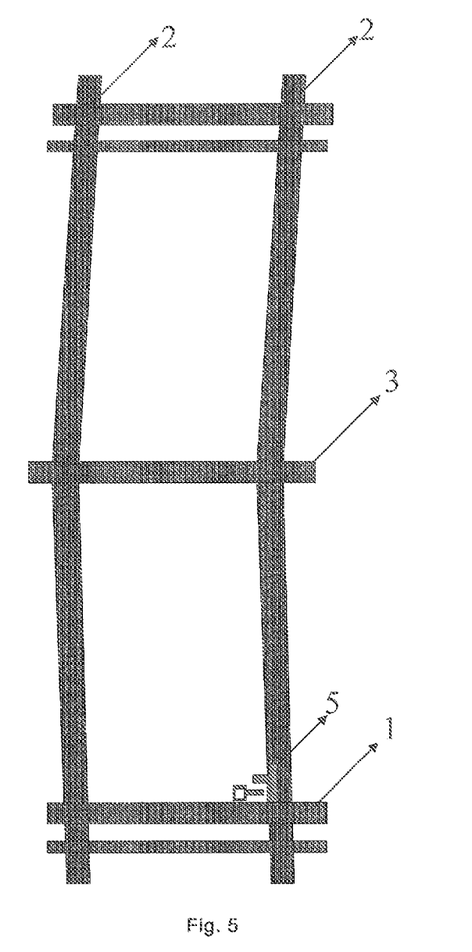
Figure 6:
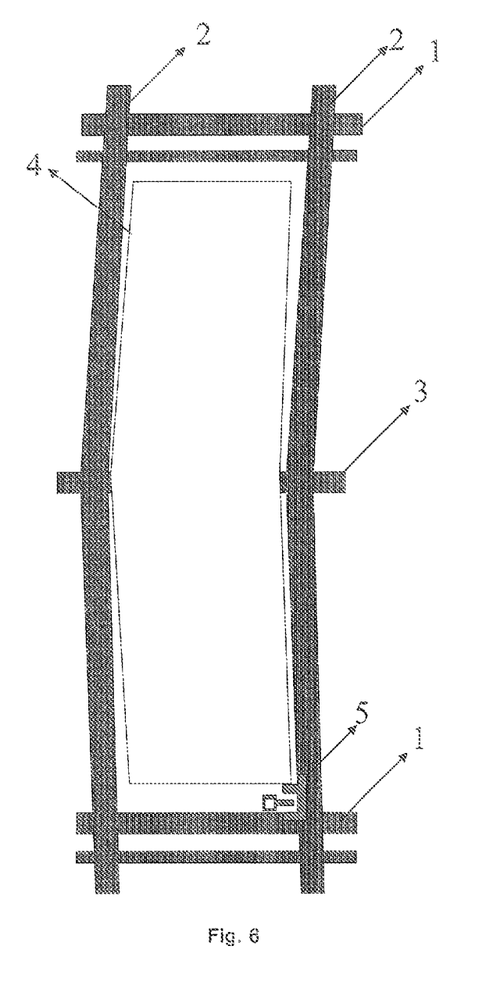
Figure 7:
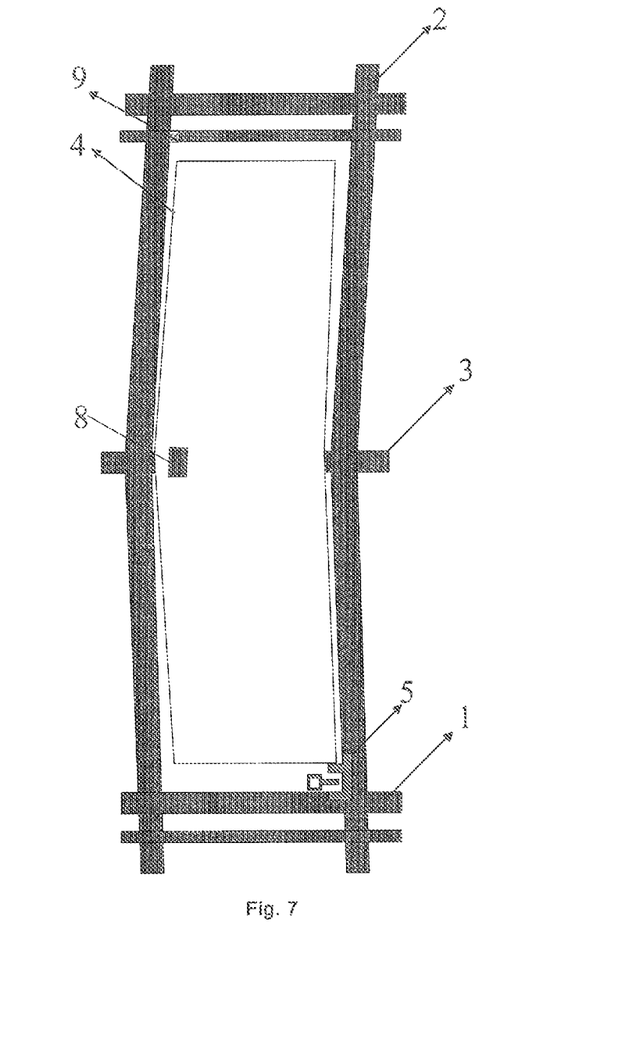
Figure 8:
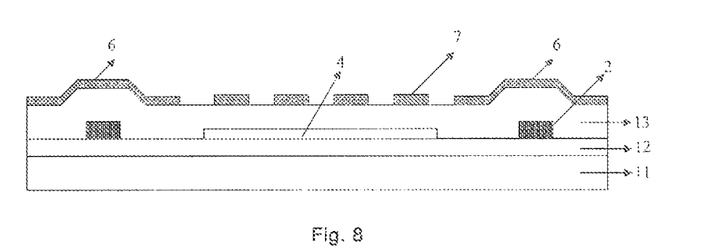
FIG. 8 is a sectional view of the array substrate according to an embodiment of the present invention.

Hereinafter is provided a preferred embodiment where the common electrode line 3 and the second common electrode 7 are located on different layers. The grid line 1 and the common electrode line 3 are formed on the substrate 11, and the grid line 1 does not intersect with the common electrode line 3 (as shown in FIG. 4, a first layer of ITO is deposited onto the substrate, after exposure and development, the grid line 1 and the common electrode line 3 as shown in FIG. 4 are obtained). A gate insulating layer 12 is formed on the substrate on which the grid line 1 and the common electrode line 3 are formed, and the data line 2 is formed on the substrate on which the gate insulating layer 12 (as shown in FIG. 5, the thin film transistor 5 may also be formed at the position where the grid line 1 vertically overlaps the data line 2 at the same time). The pixel electrode 4 is formed on the substrate on which the data line 2 is formed (as shown in FIG. 6, the data line 2 is connected to the pixel electrode 4 through the thin film transistor 5). The passivation layer 13 is formed on the substrate on which the pixel electrode is formed, and the via hole 18 is formed on the passivation layer 13 (as shown in FIG. 7). The first common electrode 6 and the second common electrode 7 are formed on the substrate on which the passivation layer 13 is formed (as shown in FIG. 3), and they are powered independently.

Of course, the above is merely one of the Implementation modes, and the other modes may also be applicable when the common electrode line 3 and the second common electrode 7 are formed on different layers. For example, the common electrode line 3 may also be formed on the same layer as the source/drain electrode of the thin film transistor.

According to the above embodiment of the present invention, the second common electrode 7 corresponding to the pixel region is separated from the first common electrode 6 for protecting the data line in a manner of being powered independently, so as to improve the greenish phenomenon caused by a coupling capacitor C2 between the data line 2 and the second common electrode 7. In addition, the above-mentioned structure can remarkably reduce the generated storage capacitance while ensuring the formation of an edge electric field, so as to drive the product at a high frequency and to meet the charge rate requirement.

Figure 9:
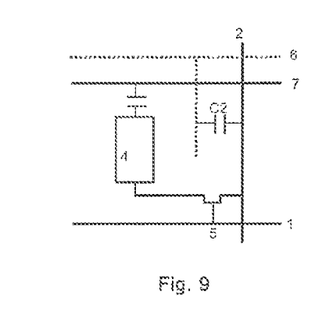
FIG. 9 is a schematic diagram showing the circuit connection of a common electrode and a data line, a grid line or a pixel electrode in the array substrate according to an embodiment of the present invention.

FIG. 9 is a schematic diagram showing the circuit connection of the common electrode and tire data line, the grid line or the pixel electrode of the array substrate according to an embodiment of the present invention. The first common electrode 6 is located above the data line 2 and covers the data line 2. In addition, the first common electrode 6 is separated from the second common electrode 7 located above the pixel electrode 4, and the first common electrode and the second common electrode are powered independently. As a result, the coupling capacitor C2 between the data line 2 and the second common electrode 7 is avoided, thereby to prevent the greenish phenomenon.

An embodiment of the present invention further provides a display device comprising the above-mentioned array substrate. The display device may be any products or components having a display function, such as a liquid crystal panel, an electronic paper, an OLED panel, a mobile phone, a tablet computer, a TV, a display, a laptop, a digital photo frame and a navigator.

The above are merely the preferred embodiments of the present invention. It should be noted that, a person skilled in the art may further make improvements and modifications without departing from the principle of the present invention, and these improvements and modifications shall also be considered as the scope of the present invention.

What is claimed is:

1. An array substrate, comprising a plurality of grid lines, a plurality of data lines, and pixel regions defined by every two adjacent grid lines and every two adjacent data lines, wherein the pixel region is provided with a common electrode, a pixel electrode and a thin film transistor, and wherein the common electrode includes a first common electrode and a second common electrode which are powered independently, a projection of the first common electrode onto a layer where the data lines are located covers the data line, and a projection of the second common electrode onto a layer where the pixel electrode is located falls on the pixel electrode, wherein the first common electrode is connected to and powered through a common electrode power supply circuit of a peripheral circuit, and the second common electrode is powered through a common electrode line,
wherein the second common electrode is located below the pixel electrode and does not overlap the data line, the second common electrode has a plate shape, and the pixel electrode has a slot structure.

2. The array substrate according to claim 1, wherein
when the common electrode line and the second common electrode are located on different layers, the second common electrode is connected to the common electrode line through a via hole; or
when the common electrode line and the second common electrode are located on the same layer, the second common electrode is directly connected to the common electrode line.

3. The array substrate according to claim 1, wherein
when the common electrode line and the second common electrode are located on different layers, the second common electrode is connected to the common electrode line through a via hole; or
when the common electrode line and the second common electrode are located on the same layer, the second common electrode is directly connected to the common electrode line.

4. The array substrate according to claim 1, wherein the grid line vertically overlaps the data line, the pixel region is of a rectangular shape, the grid line constitutes a short side of the pixel region, and the data line constitutes a long side of the pixel region.

5. The array substrate according to claim 4, wherein the thin film transistor is provided at a position where the grid line vertically overlaps the data line, and the data line is connected to the pixel electrode through the thin film transistor.

6. A method of manufacturing an array substrate, comprising a step forming a pattern including a data line and a pixel electrode, the method further comprising:
a step of forming a pattern including a first common electrode and a second common electrode, the first common electrode and the second common electrode being powered independently, a projection of the first common electrode onto a layer where the data line is located covering the data line, and a projection of the second common electrode onto a layer where the pixel electrode is located falling on the pixel electrode,
wherein the first common electrode is connected to and powered through a common electrode power supply circuit of a peripheral circuit, and the second common electrode is powered through a common electrode line,
wherein the second common electrode is located below the pixel electrode and does not overlap the data lines, the second common electrode has a plate shape, and the pixel electrode has a slot structure.

7. The method according to claim 6, wherein when forming the pattern of the first common electrode, the first common electrode is connected to a common electrode power supply circuit of a peripheral circuit.

8. The method according to claim 6, further comprising:
a step of forming a pattern of a common electrode line,
wherein when forming the pattern of the second common electrode, the second common electrode is connected to the common electrode line.

9. A display device comprising the array substrate according to claim 1.

10. The display device according to claim 9, wherein
when the common electrode line and the second common electrode are located on different layers, the second common electrode is connected to the common electrode line through a via hole; or
when the common electrode line and the second common electrode are located on the same layer, the second common electrode is directly connected to the common electrode line.

11. The display device according to claim 9, wherein the grid line vertically overlaps the data line, the pixel region is of a rectangular shape, the grid line constitutes a short side of the pixel region, and the data line constitutes a long side of the pixel region.

12. The display device according to claim 11, wherein the thin film transistor is provided at a position where the grid line vertically overlaps the data line, and the data line is connected to the pixel electrode through the thin film transistor.

* * * * *